(12) United States Patent
Khatiwada et al.

(10) Patent No.: US 11,883,810 B2
(45) Date of Patent: Jan. 30, 2024

(54) PHOTOCATALYTIC REACTOR CELL

(71) Applicant: SYZYGY PLASMONICS INC., Houston, TX (US)

(72) Inventors: Suman Khatiwada, Houston, TX (US); Trevor William Best, Houston, TX (US)

(73) Assignee: Syzygy Plasmonics Inc., Houston, TX (US)

( * ) Notice: Subject to any disclaimer, the term of this patent is extended or adjusted under 35 U.S.C. 154(b) by 176 days.

(21) Appl. No.: 16/625,495

(22) PCT Filed: Jun. 26, 2018

(86) PCT No.: PCT/US2018/039470
§ 371 (c)(1),
(2) Date: Dec. 20, 2019

(87) PCT Pub. No.: WO2019/005777
PCT Pub. Date: Jan. 3, 2019

(65) Prior Publication Data
US 2021/0178377 A1 Jun. 17, 2021

Related U.S. Application Data

(60) Provisional application No. 62/586,675, filed on Nov. 15, 2017, provisional application No. 62/525,305, (Continued)

(51) Int. Cl.
*B01J 35/00* (2006.01)
*B01J 19/12* (2006.01)
(Continued)

(52) U.S. Cl.
CPC ......... *B01J 35/004* (2013.01); *B01J 19/0013* (2013.01); *B01J 19/0053* (2013.01);
(Continued)

(58) Field of Classification Search
CPC ...... B01J 35/004; B01J 19/122; B01J 19/123; B01J 19/127; B01J 19/0013;
(Continued)

(56) References Cited

U.S. PATENT DOCUMENTS 3,554,887 A    1/1971   Feehs
4,517,063 A    5/1985   Cirjak
(Continued)

FOREIGN PATENT DOCUMENTS

AU    2018286458 B2    7/2020
BR    PI0701773 A2     12/2008
(Continued)

OTHER PUBLICATIONS

International Search Report and Written Opinion for Int. App. No. PCT/US2018/032375, dated Apr. 11, 2019.
(Continued)

*Primary Examiner* — Lessanework Seifu
(74) *Attorney, Agent, or Firm* — GrowIP Law Group LLC

(57) ABSTRACT

The present, disclosure relates generally to reactor cells comprising an enclosure and one or more plasmonic photocatalysts on a catalyst support disposed within the enclosure. In some embodiments of the disclosure, the enclosure is at least partially optically transparent.

27 Claims, 2 Drawing Sheets

Related U.S. Application Data filed on Jun. 27, 2017, provisional application No. 62/525,301, filed on Jun. 27, 2017, provisional application No. 62/525,380, filed on Jun. 27, 2017.

(51) Int. Cl.
  *B01J 19/00* (2006.01)
  *H01M 14/00* (2006.01)

(52) U.S. Cl.
  CPC .......... *H01M 14/005* (2013.01); *B01J 19/123* (2013.01); *B01J 19/127* (2013.01); *B01J 19/128* (2013.01); *B01J 2219/0877* (2013.01); *B01J 2219/0892* (2013.01)

(58) Field of Classification Search
  CPC ............ B01J 19/0053; B01J 2219/0875; B01J 2219/0877; B01J 2219/0892; C02F 1/30; C02F 1/32; C02F 1/325
  See application file for complete search history.

(56) References Cited

U.S. PATENT DOCUMENTS

| | | | |
|---|---|---|---|
| 4,788,040 A | 11/1988 | Campagnolo et al. | |
| 5,030,607 A | 7/1991 | Colmenares | |
| 5,298,226 A | 3/1994 | Nowobilski | |
| 5,501,801 A * | 3/1996 | Zhang | B01J 19/122 210/748.14 |
| 5,505,912 A * | 4/1996 | Hallett | A61L 2/10 422/186.3 |
| 5,538,931 A | 7/1996 | Heinrichs et al. | |
| 6,217,834 B1 * | 4/2001 | Hosein | B01J 19/123 210/748.1 |
| 6,248,217 B1 | 6/2001 | Biswas et al. | |
| 6,979,362 B2 | 12/2005 | Jackson | |
| 8,506,886 B2 | 8/2013 | Owen et al. | |
| 8,753,579 B2 | 6/2014 | Sattler et al. | |
| 8,999,283 B1 * | 4/2015 | Kuhn | B01J 23/002 423/418.2 |
| 9,404,797 B2 | 8/2016 | Walters | |
| 10,766,024 B2 * | 9/2020 | Halas | B01J 37/031 |
| 2005/0231711 A1 | 10/2005 | Benoit et al. | |
| 2008/0299017 A1 | 12/2008 | Sattler et al. | |
| 2009/0321244 A1 | 12/2009 | Smith et al. | |
| 2009/0321365 A1 | 12/2009 | Eriksson et al. | |
| 2010/0137131 A1 | 6/2010 | Awazu et al. | |
| 2010/0221166 A1 | 9/2010 | Muggli | |
| 2012/0168300 A1 | 7/2012 | Kolios et al. | |
| 2012/0228236 A1 * | 9/2012 | Hawkins, II | B01J 19/123 422/186 |
| 2012/0279872 A1 | 11/2012 | Chen et al. | |
| 2013/0008857 A1 | 1/2013 | Foster | |
| 2013/0026027 A1 | 1/2013 | Bae et al. | |
| 2013/0121889 A1 * | 5/2013 | Usami | C11C 3/14 422/186 |
| 2014/0272623 A1 | 9/2014 | Jennings | |
| 2016/0193595 A1 | 7/2016 | Nagpal et al. | |
| 2016/0340593 A1 | 11/2016 | Macdonnell et al. | |
| 2016/0367968 A1 | 12/2016 | Guerrero et al. | |
| 2017/0173350 A1 | 6/2017 | Bourke, Jr. et al. | |
| 2018/0147313 A1 | 5/2018 | Cheng et al. | |
| 2018/0333712 A1 | 11/2018 | Halas et al. | |
| 2021/0023255 A1 | 1/2021 | Keith | |

FOREIGN PATENT DOCUMENTS

| | | |
|---|---|---|
| CN | 1941485 A | 4/2007 |
| CN | 1962036 A | 5/2007 |
| CN | 103861542 A | 6/2014 |
| CN | 104056546 A | 9/2014 |
| CN | 104069722 A | 10/2014 |
| CN | 105289685 A | 2/2016 |
| ES | 2577904 A2 | 7/2016 |
| GB | 2552171 A | 1/2018 |
| IN | 104056546 A | 9/2014 |
| JP | 2002166176 A | 6/2002 |
| JP | 2002210333 A | 7/2002 |
| JP | 2003340241 A | 12/2003 |
| JP | 2005169298 A | 6/2005 |
| JP | 2006107956 A | 4/2006 |
| JP | 2006256901 A | 9/2006 |
| JP | 2007061730 A | 3/2007 |
| JP | 2007308318 A | 11/2007 |
| JP | 2008264611 A | 11/2008 |
| JP | 4589943 B2 | 12/2010 |
| JP | 2011110492 A | 6/2011 |
| JP | 2016530069 A | 9/2016 |
| KR | 101712373 B1 | 3/2017 |
| KR | 101725059 B1 | 4/2017 |
| MX | 2011000963 A | 5/2011 |
| RU | 2386474 C1 | 4/2010 |
| RU | 2437715 C1 | 12/2011 |
| WO | 2012017637 A1 | 2/2012 |
| WO | 2012031357 A1 | 3/2012 |
| WO | 2015/002944 A2 | 1/2015 |
| WO | 2015109217 A1 | 7/2015 |
| WO | 2016030753 A1 | 3/2016 |
| WO | 2016052987 A1 | 4/2016 |
| WO | 2018/011550 A1 | 1/2018 |
| WO | 2018011550 A1 | 1/2018 |
| WO | 2018153630 A1 | 8/2018 |
| WO | 2018/231398 A2 | 12/2018 |
| WO | 2019/005777 A1 | 1/2019 |
| WO | 2019/005779 A1 | 1/2019 |
| WO | 2019005779 A1 | 1/2019 |
| WO | 2018/231398 A8 | 11/2019 |
| WO | 2020/146799 A1 | 7/2020 |
| WO | 2020/146813 A1 | 7/2020 |
| WO | 2020146799 A1 | 7/2020 |

OTHER PUBLICATIONS

International Preliminary Report on Patentability for Int. App. No. PCT/US2018/032375, dated Nov. 12, 2019.
Shou, Q., et al., "Synthesis and characterization of a nanocomposite of goethite nanorods and reduced graphene oxide for electrochemical capacitors, " Journal of Solid State Chemistry, vol. 185, pp. 191-197, 2012.
Swearer, D.F., et al., "Heterometallic antenna-reactor complexes for photocatalysis," PNAS, vol. 113, pp. 8916-8920, 2016.
International Search Report and Written Opinion for Int. App. No. PCT/US2018/039470, dated Sep. 7, 2018.
Alfano O.M. et al., "Photocatalysis in Water Environments Using Artificial and Solar Light," Catalysis Today, 2000; 58:199-230.
De Lasa H. et al., "Photocatalytic Reaction Engineering," Springer, Boston, MA, 2005.
Kachaev A.A. et al. "Optically Transparent Ceramic (Review)". Glass Ceram 73, 117-123 (2016).
Mozia S., "Photocatalytic Membrane Reactors (PMRs) in Water and Wastewater Treatment: A Review," Sep. Purif. Technol., 2010, 73 (2), 71-91.
Nair V. et al., "Thermo-Photocatalysis: Environmental and Energy Applications," ChemSusChem, 2019, 12 (10), 2098-2116.
Pasquali M. et al., "Radiative Transfer in Photocatalytic Systems," AIChE J., 1996, 42 (2), 532-537.
Robatjazi H. et al. "Plasmon-Driven Carbon-Fluorine (C(Sp 3)-F) Bond Activation with Mechanistic Insights into Hot-Carrier-Mediated Pathways." Nat. Catal. 2020, 3 (7), 563-73.
Shou et al. "Synthesis and characterization of a nanocomposite of goethite nanorods and reduced graphene oxide for electrochemical capacitors." J. Solid State Chemistry, 2012, vol. 185, 191-197.
Stankiewicz A. "Energy Matters: Alternative Sources and Forms of Energy for Intensification of Chemical and Biochemical Processes." Chem. Eng. Res. Des., 84 (7A), 511-521 (2006).
Su Y. et al., "Photochemical Transformations Accelerated in Continuous-Flow Reactors: Basic Concepts and Applications," Chem.-A Eur. J., 2014, 20 (34), 10562-10589.

(56) References Cited

OTHER PUBLICATIONS

Swearer, Dayne F., et al., "Heterometallic antenna-reactor complexes for photocatalysis" PNAS, vol. 113, No. 32, Aug. 9, 2016.
Van Gerven T. et al., "A Review of Intensification of Photocatalytic Processes," Chem. Eng. Process. Process Intensif., 2007, 46 (9 Spec. Iss.), 781-789.
Van Gerven T. et al., "Structure, Energy, Synergy, Time." Ind. Eng. Chem. Res., 2009, 2465-2474.
Xiao, et al. "Visible light-driven cross-coupling reactions at lower temperatures using a photocatalyst of palladium and gold alloy nanoparticles." ACS Catal., 2014, vol. 4, 1725-1734.
Zhou L. et al., "Light-Driven Methane Dry Reforming with Single Atomic Site Antenna-Reactor Plasmonic Photocatalysts," Nat. Energy, 2020, 5 (1), 61-70.
Zhou L. et al., "Quantifying Hot Carrier and Thermal Contributions in Plasmonic Photocatalysis," Science, Oct. 5, 2018, 69-72.
Paolo Ciambelli et al., "Improved Performances of a Fluidized Bed Photoreactor by a Microscale Illumination System", International Journal of Photoenergy, vol. 2009, Jan. 1, 2009 (Jan. 1, 2009), pp. 1-7.
Zacarias Silvia Mercedes et al: "Design and performance evaluation of a photocatalytic reactor for indoor air disinfection", Environmental Science and Pollution Research, Springer Berlin Heidelberg, Berlin/Heidelberg, vol. 28, No. 19, Nov. 21, 2020, pp. 23859-23867.
Li et al. Hydrogen Evolution by Photocatalytic Steam Reforming of Methane over PT/TiO2. Acta Phys.-Chim. Sin., 2012, 28 (2) 450-456. (English Abstract).

\* cited by examiner

PHOTOCATALYTIC REACTOR CELL

RELATED APPLICATIONS

The present application is a U.S. National Phase Application pursuant to 35 U.S.C. § 371 of International Application No. PCT/US2018/039470 filed Jun. 26, 2018, which claims priority to and hereby incorporates by reference the entireties of the following U.S. patent applications: U.S. Provisional Patent Application No. 62/525,301, filed on Jun. 27, 2017, U.S. Provisional Patent Application No. 62/525,305, filed on Jun. 27, 2017, U.S. Provisional Patent Application No. 62/525,380, filed on Jun. 27, 2017, and U.S. Provisional Patent Application No. 62/586,675, filed on Nov. 15, 2017.

In addition, the entireties of the following applications are incorporated by reference herein: International Patent Application No. PCT/US18/32375, filed on May 11, 2018, U.S. patent application Ser. No. 15/977,843, filed on May 11, 2018, and International Patent Application No. (to be assigned), titled "Photocatalytic Reactor Having Multiple Photocatalytic Reactor Cells," filed concurrently herewith.

BACKGROUND OF THE DISCLOSURE

1. Field of the Disclosure

The present disclosure relates generally to photocatalytic reactor cells comprising an enclosure and one or more plasmonic photocatalysts on a catalyst support disposed within the enclosure.

2. Technical Background

Industrial processes depend extensively on heterogeneous catalysts for chemical production and mitigation of environmental pollutants. These processes often rely on metal nanoparticles dispersed into high surface area support materials to both maximize catalytically active surface area and for the most cost-effective use of the catalysts (such as palladium, platinum, ruthenium, or rhodium). The catalytic processes utilizing transition metal nanoparticles are often energy intensive, relying on high temperatures and pressures to maximize catalytic activity. Thus, there remains a need for efficient and cost-effective catalytic reactors and systems.

SUMMARY OF THE DISCLOSURE

The inventors have found efficient reactor cells that utilize an artificial or natural light source. The reactor cells of the disclosure can be designed to maximize absorption of one or more target wavelengths and/or catalyze a desired chemical reaction. As a result, the reactor cells disclosed herein may be cost effective and environmentally sustainable solutions for many current industrial processes.

Thus, in one aspect, the present disclosure provides a reactor cell comprising: an optically transparent enclosure comprising at least one input and at least one output; and one or more plasmonic photocatalysts on a catalyst support disposed within the enclosure, wherein the plasmonic photocatalyst comprises a catalyst coupled to a plasmonic material, such as through a physical, electronic, thermal, or optical coupling. Upon application of a light source, the reactor cell is configured to transform at least one reactant into at least one reformate.

Another aspect provides methods for using one or more of the disclosed reactor cells to transform reactants. Specifically, the disclosure provides methods for transforming at least one reactant into at least one reformate. The method includes: (a) adding at least one reactant into a reactor cell of the disclosure; and (b) illuminating, via the at least one light source, at least an interior of the reactor cell.

In another aspect, the present disclosure provides a reactor cell comprising: an enclosure comprising at least one input, at least one output, and a central cavity; a light source disposed in the central cavity; and one or more plasmonic photocatalysts on a catalyst support disposed within the enclosure and substantially surrounding the central cavity, wherein the plasmonic photocatalyst comprises a catalyst coupled to a plasmonic material, such as through a physical, electronic, thermal, or optical coupling.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity and/or illustrated as simplistic representations in order to promote comprehension. The drawings illustrate one or more embodiment(s) of the disclosure, and together with the description, serve to explain the principles and operation of the disclosure.

DETAILED DESCRIPTION

Figure 1A:
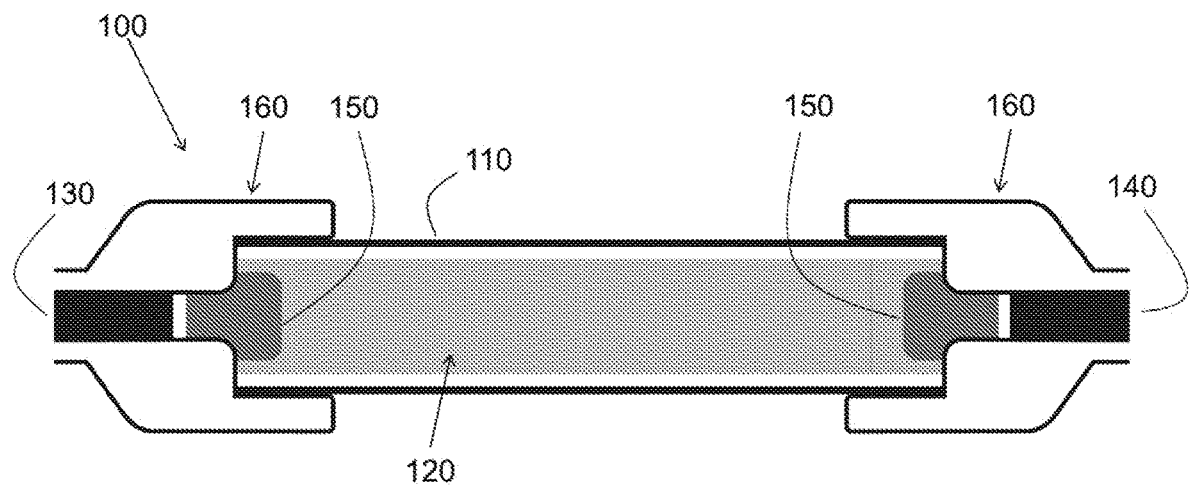
FIG. 1A is a cross-sectional side view of a reactor cell according to one embodiment of the disclosure.

Before the disclosed apparatus and methods are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other component, feature, element, or step or group of components, features, elements or steps.

As used in the specification and the appended claims, the singular forms "a," "an," and "the" include plural referents unless the context clearly dictates otherwise.

As used herein, the term "coupling" includes physical, electronic, thermal, or optical coupling of one element to another element.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified. A weight percent (weight %, also as wt %) of a component, unless specifically stated to the contrary, is based on the total weight of the composition in which the component is included (e.g., on the total amount of the catalyst material).

In view of the present disclosure, the processes and active materials described herein can be configured by the person of ordinary skill in the art to meet the desired need. In general, the disclosed materials, methods, and apparatus provide improvements in photocatalysis processes and materials. In general, the present disclosure provides a reactor cell comprising: an enclosure comprising at least one input and at least one output; and one or more plasmonic photocatalysts on a catalyst support disposed within the enclosure. Typically, the plasmonic photocatalyst comprises a catalyst coupled to a plasmonic material, such as through a physical, electronic, thermal, or optical coupling. The reactor cells of the disclosure are configured, upon application of a light source, to transform at least one reactant into at least one reformate.

In traditional fixed bed reactors, the catalyst beds are not optically transparent (i.e., the light does not penetrate the catalyst bed). In contrast, according to some embodiments of the disclosure, at least the support is optically transparent. In other embodiments, the reactor cells of the disclosure additionally or alternatively comprise an enclosure that is optically transparent. In some embodiments, the optically transparent enclosure has at least 50% transmittance for a predetermined light wavelength. For example, in some embodiments, the optically transparent enclosure has between about 50% to about 100% transmittance for a predetermined light wavelength or at least 55%, or at least 60%, or at least 70%, or at least 80%, or at least 90%, or at least 95%, or even at least 98% transmittance for a predetermined light wavelength.

Advantageously, the optically transparent enclosure according to some embodiments of the disclosure may have low thermal expansion. Thus, in one embodiment, the optically transparent enclosure comprises a material having less than about $1 \times 10^{-4}/°$ K linear coefficient of thermal expansion (CTE). In another embodiment, the optically transparent enclosure comprises a material having less than about $1 \times 10^{-5}/°$ K CTE; or less than about $5 \times 10^{-6}/°$ K CTE; or less than about $3 \times 10^{-6}/°$ K CTE; or even less than about $1 \times 10^{-6}/°$ K CTE. For example, some exemplary materials with suitable CTE values include, but are not limited to, borosilicate glass at $3.2 \times 10^{-6}/°$ K, PYREX® glass at $3.2 \times 10^{-6}/°$ K, quartz at about $0.59 \times 10^{-6}/°$ K to about $9 \times 10^{-6}/°$ K, sapphire $5.3 \times 10^{-6}/°$ K, and fused silica at $0.55 \times 10^{-6}/°$ K.

One of skill in the art will recognize than any material having the desired transmittance for a predetermined light wavelength (or range of wavelengths) and/or coefficient of thermal expansion (CTE) may be used. In some embodiments, the optically transparent enclosure comprises glass, borosilicate glass, quartz, fused quartz, aluminosilicate glass, lithium-aluminosilicate glass, sapphire, or combinations thereof.

In one embodiment, the optically transparent enclosure is optically transparent on all sides of the enclosure. But one of skill in the art would appreciate that, in one embodiment, the optically transparent enclosure may not be optically transparent on all sides of the enclosure. For example, an outer cavity of the optically transparent enclosure may comprise a reflective surface facing a central cavity (which may be optically transparent). Alternatively, substantially the entire inner surface of the enclosure may be reflective, rather than optically transparent, which may be beneficial in embodiments utilizing a light source internal to the reactor cell. Such embodiments, including those comprising an outer cavity and central cavity, are described in further detail below.

The reactor cells of the disclosure also require one or more plasmonic photocatalysts comprising a catalyst coupled to a plasmonic material, such as through a physical, electronic, thermal, or optical coupling. Without being bound by theory, the plasmonic material is believed to act as an optical antenna capable of absorbing light due to the unique interaction of light with plasmonic materials and, as a result, generates a strong electric field on and near the plasmonic material (i.e., as a result of collective oscillation of electrons within the plasmonic material). This strong electric field on and near the plasmonic material allows for coupling between the catalyst and the plasmonic material, even when the catalyst and the plasmonic material are separated by distances of up to about 20 nm or more.

In general, the plasmonic material may be any metal, metal alloy, metalloid element, or its alloy. In some embodiments, the plasmonic material of the disclosure is selected from gold, gold alloy, silver, silver alloy, copper, copper alloy, aluminum, or aluminum alloy. In the present disclosure the term "alloys" is intended to cover any possible combination of metals. For example, the alloys may be binary alloys such as AuAg, AuPd, AuCu, AgPd, AgCu, etc., or they may be ternary alloys, or even quaternary alloys.

In some embodiments, the plasmonic material of the disclosure comprises an oxide shell surrounding a non-oxidized core. In one or more embodiments, the oxide shell may be a natural/native oxide shell that forms upon a metal or alloy's exposure to air or water. For example, a copper plasmonic material may possess a copper oxide (e.g., $CuO$ or $Cu_2O$) shell surrounding a copper core, or an aluminum plasmonic material may possess an aluminum oxide shell surrounding an aluminum core. In some embodiments, the oxide shell may be at least partially artificially produced, such as by artificially increasing the thickness of a native/natural oxide shell by appropriate chemical methods, or by chemically synthesizing, or otherwise depositing, an oxide material around a pre-formed plasmonic material. In some embodiments, the oxide shell may have a thickness of up to about 30 nm, or up to about 25 nm, or up to about 15 nm. In some embodiments, the oxide shell may have a thickness of at least about 0.5 nm, or at least 1 nm, or at least 1.5 nm. In some embodiments, the oxide shell has a thickness ranging from about 0.1 nm to about 5 nm; or from about 0.1 nm to about 30 nm; or from about 1 nm to about 5 nm; or from about 1 nm to about 30 nm.

One of skill in the art will recognize that the size, shape, and chemical structure of the plasmonic material will affect the absorption of one or more target wavelengths. Thus, the plasmonic material or materials may be designed to maximize absorption of one or more target wavelengths (e.g., to recognize the target wavelength(s) but have the material absorb relatively less of other, non-target wavelengths). In another example, the plasmonic material of the disclosure may be designed to catalyze a desired chemical reaction. Thus, in some embodiments, the plasmonic material of the disclosure may have a plasmon resonant frequency, or optical absorption maximum, in the ultraviolet to infrared region of the electromagnetic spectrum. In some embodiments, the plasmonic material has a plasmon resonant frequency in the visible light spectrum (such as at a wavelength ranging from about 380 nm to about 760 nm).

In general, the catalyst material coupled to the plasmonic material may be any compound capable of catalyzing a desired reaction (e.g., even if it were not coupled to a plasmonic material). For example, the catalyst may be capable of oxidation and reduction chemistry, water or air pollution remediation reactions, $NO_X$ and $N_2O$ decompositions, catalyzing hydrogenation reactions such as acetylene hydrogenation, carbon dioxide conversion to carbon monoxide via the reverse water-gas shift reaction (which can be coupled with a hydrogenation to create hydrocarbons using FisherTropsch synthesis), and nitrogen activation chemistry, including the synthesis of ammonia. In some embodiments, the catalyst of the disclosure may be any metal or metalloid element, and any alloy, oxide, phosphide, nitride, or combination thereof of said elements. For example, the catalyst of the disclosure may comprise catalytically active palladium, platinum, ruthenium, rhodium, nickel, iron, copper, cobalt, iridium, osmium, titanium, vanadium, indium, or any combination thereof. The catalyst of the disclosure may comprise any alloy, oxide, phosphide, or nitride of catalytically active palladium, platinum, ruthenium, rhodium, nickel, iron, copper, cobalt, iridium, osmium, titanium, vanadium, or indium. In some embodiments, the catalyst of the disclosure comprises catalytically active iron or copper. In some embodiments, the catalyst of the disclosure may be intermetallic nanoparticles, core-shell nanoparticles, or semiconductor nanoparticles (e.g., $Cu_2O$).

In some embodiments, the catalyst may be physically attached to the plasmonic material, while in other embodiments the catalyst may be separated by a small distance from the plasmonic material (but still coupled thereto, such as through a physical, electronic, thermal, or optical coupling). The separation may be either by empty space (i.e., a distinct physical separation) or the separation may be by the thin oxide layer discussed above. For example, the plasmonic material and the catalyst may be separated by a small distance when they are prepared via lithographic methods to have a distinct physical separation. In one or more embodiments, the small separation may be a distance of up to about 30 nm, or up to about 25 nm, or up to about 15 nm. In some embodiments, the separation may be at least about 0.5 nm, or at least 2 nm, or at least 5 nm, or at least 10 nm. In some embodiments, one or more catalysts may be physically attached to the surface of a single plasmonic material, which can increase the surface area available for reactions. In some embodiments, the catalyst may form a shell that surrounds the plasmonic material.

The plasmonic photocatalysts may have a diameter ranging from about 5 nm to about 300 nm. In some embodiments, the plasmonic photocatalyst of the disclosure may have a diameter ranging from about 10 nm to about 300 nm; or about 50 nm to about 300 nm; or about 80 nm to about 300 nm; or about 100 nm to about 300 nm; or about 5 nm to about 250 nm; about 10 nm to about 250 nm; or about 50 nm to about 250 nm; or about 80 nm to about 250 nm; or about 100 nm to about 250 nm; or about 5 nm to about 200 nm; about 10 nm to about 200 nm; or about 50 nm to about 200 nm; or about 80 nm to about 200 nm; or about 100 nm to about 200 nm; or about 80 nm to about 200 nm.

The reactor cells according to at least some embodiments also include one or more plasmonic photocatalysts dispersed onto a catalyst support. As with the enclosure, in some embodiments, the catalyst support has a low absorbance, and in particular, a low enough absorbance (for the particular radiation wavelength or wavelength range) so that the reactants are exposed to a sufficient amount of radiation to result in the desired catalytic effect for the particular reactor cell geometry in use.

Figure 2:
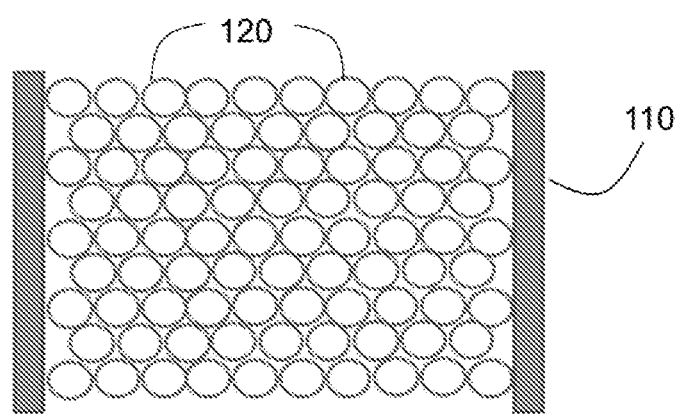
FIG. 2 is a cross-sectional detail view of an example configuration of the reactor cell having a catalyst support in bead form.

One of skill in the art will recognize that any material having the desired absorbance or transmittance for a predetermined light wavelength (or set or range of light wavelengths) may be used for the catalyst support. In some embodiments, the catalyst support comprises silica, quartz, fused quartz, glass, borosilicate glass, aluminosilicate glass, lithium-aluminosilicate glass, sapphire, diamond, or combinations thereof. The catalyst support of the disclosure may be in any form known in the art, such as in the form of beads, microporous beads, fibers, spheres, pellets, cylinders (hollow or otherwise), honeycombs, or symmetrical or asymmetrical tri-quadrulobes (for example, using extrusion or tableting methods). For example, FIG. 2 illustrates a cross-sectional view of the catalyst support in the bead form. In some embodiments, the catalyst support of the disclosure may be an aerogel. Suitable aerogels include, but are not limited to, silicon dioxide aerogel, aluminum oxide aerogel, titanium dioxide aerogel, zirconium dioxide aerogel, holmium oxide aerogel, samarium oxide aerogel, erbium oxide aerogel, neodymium(III) oxide aerogel, or a combination thereof. In some embodiments, the catalyst support of the disclosure is a silicon dioxide aerogel. One of skill will recognize that when the support is an aerogel, the plasmonic photocatalyst may be dispersed throughout the aerogel (for example, the plasmonic photocatalyst may be embedded into the aerogel). In some embodiments, the catalyst support of the disclosure may be transparent aluminum oxide (such as $\alpha$-phase aluminum oxide or $\gamma$-phase aluminum oxide).

The plasmonic photocatalyst may be present on the catalyst support in any amount suitable for the desired use. For example, the plasmonic photocatalyst may be present on the catalyst support in an amount between about 0.01 wt % and about 30 wt %; or about 0.01 wt % and about 80 wt %; or about 10 wt % and about 80 wt %; or about 0.01 wt % and about 70 wt %; or about 10 wt % and about 70 wt %. In some embodiments, the plasmonic photocatalyst may be present on the catalyst support in an amount between about 0.01 vol % and about 30 vol %; or about 0.01 vol % and about 20 vol %; or about 10 vol % and about 50 vol %; or about 0.01 vol % and about 70 vol %; or about 10 vol % and about 70 vol %.

In some embodiments, the plasmonic photocatalyst may be present on the catalyst support as a thin coating on the outer surface of the support (e.g., as one or a few layers). In one or more embodiments, the plasmonic photocatalyst layer that is coated onto the support may be up to about 30 nm, or up to about 25 nm, or up to about 15 nm; or at least about 0.5 nm, or at least 2 nm, or at least 5 nm, or at least 10 nm; or between about 5 nm to about 300 nm; or about 10 nm to about 300 nm; or about 50 nm to about 300 nm; or about 80 nm to about 300 nm; or about 100 nm to about 300 nm; or about 5 nm to about 200 nm; about 10 nm to about 200 nm; or about 50 nm to about 200 nm; or about 80 nm to about 200 nm; or about 100 nm to about 200 nm; or about 80 nm to about 200 nm; or about 5 nm to about 100 nm; about 10 nm to about 100 nm; or about 50 nm to about 100 nm; or about 10 nm to about 50 nm; or about 1 nm to about 50 nm.

In some embodiments, the reactor cell comprises one plasmonic photocatalyst on the catalyst support disposed within the enclosure (e.g., one type of supported plasmonic photocatalyst would be disposed within the enclosure). In some embodiments, the reactor cell comprises two or more plasmonic photocatalysts on the catalyst support disposed within the enclosure (e.g., two or more different supported plasmonic photocatalysts would be disposed within the enclosure). Two or more plasmonic photocatalysts on the catalyst support may be provided, either mixed or in distinct layers. For example, each layer would have one type of supported plasmonic photocatalyst having a desired plasmon resonant frequency and/or a desired diameter. In a non-limiting example, one layer would absorb one desired wavelength range relative to other wavelengths, the next layer would absorb another wavelength range, and the final layer (e.g., an intermediate layer) would absorb other wavelengths, such as wavelengths outside the first and second wavelength ranges.

Figure 1B:
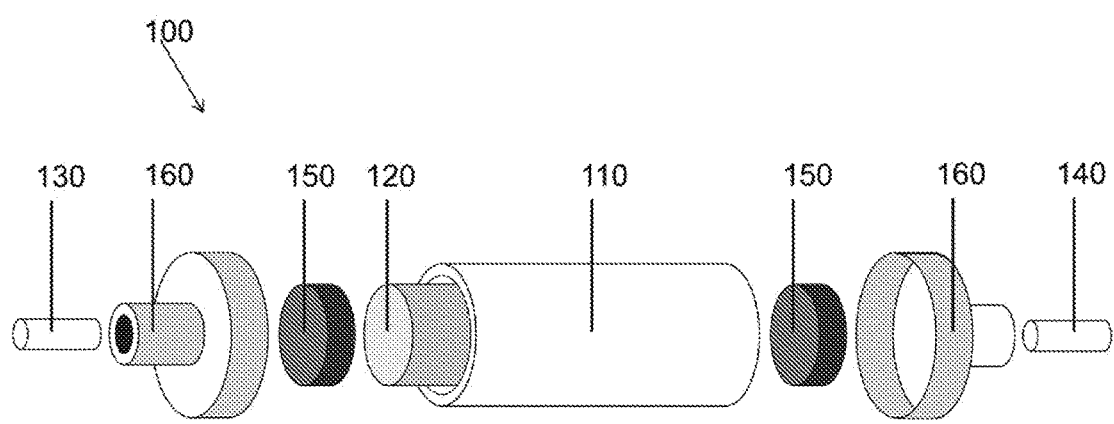
FIG. 1B is exploded perspective side view of a reactor cell according to one embodiment of the disclosure.

In general, the reactor cell is designed to allow for illumination of the plasmonic photocatalysts with a light source. One embodiment of the reactor cell of the disclosure is shown in cross-sectional view in FIG. 1A. The same reactor cell 100 elements are also shown in exploded view in FIG. 1B. Here, a reactor cell 100 is shown comprising a plasmonic photocatalyst on a catalyst support 120 disposed within an optically transparent enclosure 110. The reactor cell 100 may further comprise fittings 160 configured to attach the cell to at least one delivery channel for at least one reactant input 130 and at least one reformate output 140. The reactor cell 100 may further comprise one or more packing support elements 150 configured to retain the catalyst within the optically transparent enclosure 110.

The size and shape of the enclosure of the reactor cell may be adapted to meet the desired need. In some embodiments, the enclosure has an inner diameter ranging from about 0.2 cm to about 10 cm; or about 0.5 cm to about 3 cm. In some embodiments, the enclosure has a length ranging from about 10 cm to about 2 m; or about 50 cm to about 1 m. The enclosure of the reactor cell may have a circular cross-section or a polygonal cross-section, for example.

As noted above, the reactor cell may further comprise one or more fittings (such as fittings 160 in FIGS. 1A-1B) configured to attach the reactor cell to at least one delivery channel for delivering the at least one reactant to or the at least one reformate from the enclosure. For example, the fittings may comprise a first fitting coupled to the reactant input and a second fitting coupled to the reformate output. The fittings of the disclosure may comprise, for example, low alloy steel, high alloy steel, chrome alloys, nickel alloys, plastics, glass, borosilicate glass, quartz, fused quartz, aluminosilicate glass, lithium-aluminosilicate glass, or combinations thereof. Depending on the need, the fittings of the disclosure may further comprise an O-ring or another sealing mechanism. Other fitting materials and/or sealing mechanisms are also possible, and are intended to be within the scope of the present disclosure.

The reactor cell may further comprise one or more packing support elements (such as packing support elements 150 in FIGS. 1A-1B) configured to retain the catalyst within the enclosure. In some embodiments, the packing support elements are provided at the input end and at the output end of the reactor cell. In some embodiments, the packing support elements are provided at the input end, the output end, and spaced throughout of the reactor cell. Conventional materials for use as a packing support may be used, such as metal mesh, glass beads (having a larger diameter than the support), glass wool, monolith, polymer, or elastomer, for example.

In some embodiments, the optically transparent enclosure further comprises an outer cavity and a central cavity arranged coaxially with the outer cavity, wherein the outer cavity contains the plasmonic photocatalyst on the catalyst support and the central cavity is configured to receive a light source or a thermal management feature. In some embodiments, the light source is disposed within the central cavity of the enclosure. In some embodiments, the light source extends along or through a length of the enclosure. Any suitable light source may be used such as, but not limited to, LED, metal halide bulb, high pressure sodium bulb, xenon lamp, incandescent bulb, fluorescent bulb, halogen bulb, HID, laser or combination thereof. Natural light, such as solar light, may also be directed into the central cavity to serve as the light source. In some embodiments, the thermal management feature is disposed within the central cavity of the optically transparent enclosure. Any thermal management feature known in the art might be used. For example, the thermal management feature may include a fluid input coupled to a first end of the central cavity and a fluid output coupled to a second end of the central cavity such that fluid may flow through the reactor cell to add or remove heat from the reactor cell; or the thermal management feature may comprise a metal rod or metal wires configured for heat conduction.

Another aspect provides methods for using the reactor cells to transform reactants. Specifically, the disclosure provides methods for transforming at least one reactant into at least one reformate, the method comprising: adding at least one reactant into a reactor cell of the disclosure; and illuminating, via the at least one light source, an interior of the reactor cell.

In an alternative embodiment of the methods of the disclosure, the illuminating is from a light source external to the enclosure, and the enclosure is substantially optically transparent.

In some embodiments, the method further comprises heating the at least one cell via the at least one reactant reacting with the plasmonic photocatalyst (e.g., no external heating is applied, such as by a dedicated heating source). In some embodiments, the methods further comprise externally heating the reactor cell. The external heating may be accomplished via the thermal management feature as described above, or via some other heating technique.

Representative methods of the disclosure include, but are not limited to, oxidation and reduction, water or air pollution remediation reactions, $NO_X$ and $N_2O$ decompositions, hydrogenation such as acetylene hydrogenation, carbon dioxide conversion, and nitrogen activation, including the synthesis of ammonia. Some of the representative chemical transformations include:

$$CH_4 + H_2O \rightarrow H_2 + CO$$

$$CH_4 + CO_2 \rightarrow H_2 + CO$$

$$H_2O + CO \rightarrow H_2 + CO_2$$

$$CO_2 + H_2 \rightarrow CO + H_2O$$

$$CO_2 + H_2 \rightarrow CH_4 + H_2O$$

$$N_2O \rightarrow N_2 + O_2$$

$$C_2H_2 + H_2 \rightarrow C_2H_4$$

$$H_2 + N_2 \rightarrow NH_3$$

$$CO_2 + H_2 \rightarrow CH_3OH + H_2O$$

Thus, in some embodiments, the reactants are methane and water; or the reactants are methane and carbon dioxide; or the reactants are carbon monoxide and water; or the reactants are carbon dioxide and hydrogen gas; or the reactant is nitrous oxide; or the reactants are acetylene and hydrogen gas; or the reactants are hydrogen gas and nitrogen gas; or the reactants are carbon dioxide and hydrogen gas.

The methods of the disclosure may be performed at any suitable temperature. For example, in some embodiments, the methods of the disclosure are performed at a temperature ranging from about 100° C. to about 300° C.; or about 100° C. to about 250° C.; or about 100° C. to about 200° C.; or about 150° C. to about 300° C.; or about 150° C. to about 250° C.; or about 150° C. to about 200° C.; or about 200° C. to about 300° C.; or about 200° C. to about 250° C.; or about 180° C. to about 220° C.; or about 190° C. to about 210° C.; or about 20° C. to about 300° C.; or about 20° C. to about 250° C.; or about 20° C. to about 200° C.; or about 20° C. to about 150° C.; or about 20° C. to about 100° C.

The methods of the disclosure may be performed at any suitable pressure. For example, in some embodiments, the methods of the disclosure are performed at a pressure ranging from about 14 psi to about 300 psi, or about 14 psi to about 200 psi, or about 14 psi to about 100 psi, or about 14 psi to about 50 psi, or about 100 psi to about 300 psi, or about 100 psi to about 200 psi.

In the methods of the disclosure, the reactants might be introduced into the reactor cell at any suitable temperature. In some embodiments, the reactant has a temperature ranging from about 200° C. to about 300° C.; or about 200° C. to about 270° C.; or about 200° C. to about 250° C.; or about 230° C. to about 270° C., when introduced into the reactor cell.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A fixed-bed reactor cell comprising:
   an optically transparent cylindrical enclosure;
   a first fitting to attach the reactor cell at a first end of the enclosure to at least one delivery channel for receiving at least one reactant input gas;
   a second fitting to attach the reactor cell at a second end of the enclosure to at least one delivery channel for outputting at least one output gas;
   a catalyst support packed as a fixed bed substantially filling the enclosure;
   a first plasmonic photocatalyst supported by the catalyst support, wherein the first plasmonic photocatalyst comprises a catalyst coupled to a plasmonic material having a first plasmon resonant frequency designed to catalyze a desired chemical reaction by maximizing absorption of at least a first predetermined target wavelength in the electromagnetic spectrum;
   a second plasmonic photocatalyst supported by the catalyst support, wherein the second plasmonic photocatalyst differs from the first plasmonic photocatalyst and maximizes absorption of at least a second predetermined target wavelength in the electromagnetic spectrum,
   wherein, upon application of a light source to substantially an entirety of at least an interior of the enclosure while the at least one reactant input gas is passed through the enclosure, the reactor cell is configured to transform the at least one reactant input gas into the at least one output gas via the at least one reactant input gas reacting with at least the first plasmonic photocatalyst or the second plasmonic photocatalyst.

2. The reactor cell of claim 1, wherein the enclosure has at least 50% transmittance for at least one predetermined light wavelength.

3. The reactor cell of claim 1, wherein the enclosure comprises glass, borosilicate glass, quartz, fused quartz, aluminosilicate glass, lithium-aluminosilicate glass, sapphire, or combinations thereof.

4. The reactor cell of claim 1, wherein the catalyst support is selected to have an absorbance sufficiently low to catalyze the transformation of the at least one reactant input gas into the at least one output gas for the at least one predetermined target wavelength or the at least one second predetermined target wavelength in the electromagnetic spectrum.

5. The reactor cell of claim 1, wherein the catalyst support comprises silica, quartz, fused quartz, glass, borosilicate glass, aluminosilicate glass, lithium-aluminosilicate glass, sapphire, diamond, or a combination thereof.

6. The reactor cell of claim 1, wherein the catalyst support is an aerogel comprising silicon dioxide, aluminum oxide, titanium dioxide, zirconium dioxide, holmium oxide, samarium oxide, erbium oxide, neodymium(III) oxide, or a combination thereof.

7. The reactor cell of claim 1, wherein the catalyst support is a transparent aluminum oxide.

8. The reactor cell of claim 1, wherein the enclosure has an inner diameter ranging from about 0.2 cm to about 30 cm, or about 0.5 cm to about 10 cm, and a length ranging from about 10 cm to about 2 m, or about 50 cm to 1 m.

9. The reactor cell of claim 1, wherein the light source comprises at least one LED, metal halide bulb, high pressure sodium bulb, xenon lamp, incandescent bulb, fluorescent bulb, halogen bulb, HID, laser or combination thereof.

10. The reactor cell of claim 1, wherein the enclosure further comprises an outer cavity and a central cavity arranged coaxially with the outer cavity, and wherein the outer cavity contains at least the first plasmonic photocatalyst or the second plasmonic photocatalyst on the catalyst support and substantially surrounds the central cavity.

11. The reactor cell of claim 10, wherein the outer cavity of the enclosure comprises a reflective surface facing the central cavity.

12. The reactor cell of claim 10, wherein the central cavity comprises a first end coupled to a fluid input and a second end coupled to a fluid output such that fluid may flow through the reactor cell to add or remove heat from the reactor cell.

13. The reactor cell of claim 10, wherein the central cavity comprises at least one metal rod to add or remove heat from the reactor cell.

14. The reactor cell of claim 10, wherein the central cavity is configured to receive the light source.

15. The reactor cell of claim 10, wherein the central cavity is configured to receive a plurality of metal wires to add or remove heat from the reactor cell.

16. The reactor cell of claim 10, wherein the central cavity is configured to receive at least one of the light source or a means for thermal management.

17. The method of claim 16, wherein the enclosure comprises a central cavity having a first end coupled to a fluid input and a second end coupled to a fluid output, and wherein externally heating the reactor cell comprises causing a fluid to flow from the fluid input through the central cavity to the fluid output.

18. The method of claim 16, wherein externally heating the reactor cell comprises adding heat to the reactor cell via a metal rod disposed within a central cavity of the enclosure for heat conduction.

19. The method of claim 16, wherein externally heating the reactor cell comprises adding heat to the reactor cell via a plurality of metal wires disposed within a central cavity of the enclosure for heat conduction.

20. A reactor cell comprising:
an enclosure comprising at least one input, at least one output, and a central cavity;
a light source disposed in the central cavity; and
at least a first plasmonic photocatalyst and a second plasmonic photocatalyst on a catalyst support disposed within the enclosure and substantially surrounding the central cavity, wherein each of the at least the first plasmonic photocatalyst and the second plasmonic photocatalyst comprises a respective catalyst coupled to a plasmonic material having a plasmon resonant frequency designed to catalyze a desired chemical reaction by maximizing absorption of at least a predetermined target wavelength in the electromagnetic spectrum, and wherein the second plasmonic photocatalyst differs from the first plasmonic photocatalyst and maximizes absorption of at least a different predetermined target wavelength from that of the first plasmonic photocatalyst.

21. A method for transforming at least one reactant gas, the method comprising:
supplying at least one reactant input gas via at least one delivery channel into a reactor cell that comprises at least a first plasmonic photocatalyst and a second plasmonic photocatalyst on a catalyst support packed as a fixed bed substantially filling an enclosure, wherein the first plasmonic photocatalyst comprises a catalyst coupled to a plasmonic material having a first plasmon resonant frequency designed to catalyze a desired chemical reaction by maximizing absorption of at least a first predetermined target wavelength in the electromagnetic spectrum, and wherein the second plasmonic photocatalyst differs from the first plasmonic photocatalyst and maximizes absorption of at least a second predetermined target wavelength in the electromagnetic spectrum;
illuminating, via at least one light source, substantially an entirety of at least an interior of the enclosure while the at least one reactant input gas is passed through the enclosure; and
outputting at least one output gas from the reactor cell,
wherein, upon illuminating substantially the entirety of at least the interior of the enclosure while the at least one reactant input gas is passed through the enclosure, the reactor cell is configured to transform the at least one reactant input gas into the at least one output gas via the at least one reactant input gas reacting with at least the first plasmonic photocatalyst or the second plasmonic photocatalyst.

22. The method of claim 21, further comprising heating the reactor cell.

23. The method of claim 22, wherein heating the reactor cell comprises externally heating the reactor cell.

24. The method of claim 21, further comprising heating the reactor cell via only the at least one reactant reacting with the first plasmonic photocatalyst or the second plasmonic photocatalyst, without applying any additional dedicated heating source.

25. The method of claim 21, further comprising adding or removing heat from the reactor cell via means for thermal management.

26. The reactor cell of claim 20, wherein the enclosure comprises a reflective surface facing the central cavity.

27. The reactor cell of claim 1, wherein the catalyst support comprises α-phase aluminum oxide or γ-phase aluminum oxide.

* * * * *